Nov. 6, 1962   B. S. MINOR   3,061,862
PIPE WIPER AND METHOD OF MAKING THE SAME
Filed Feb. 21, 1961   2 Sheets-Sheet 1
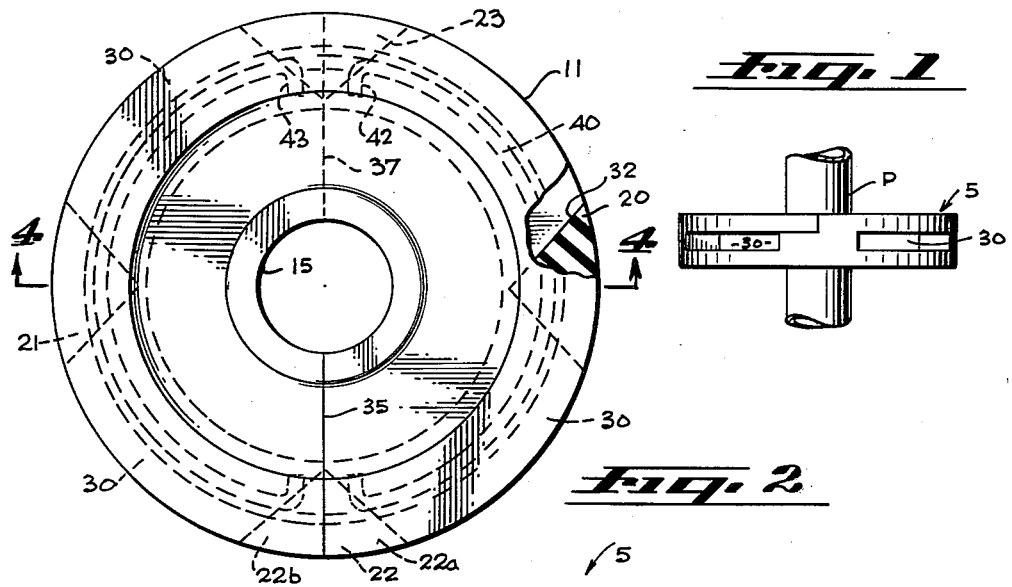
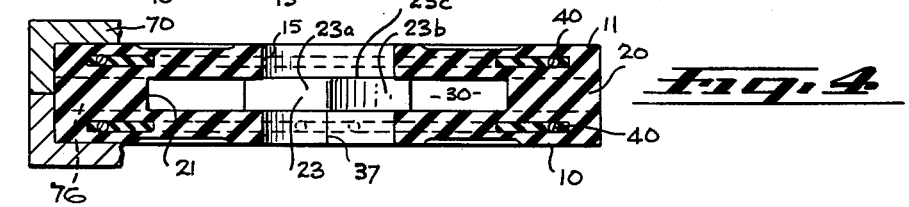
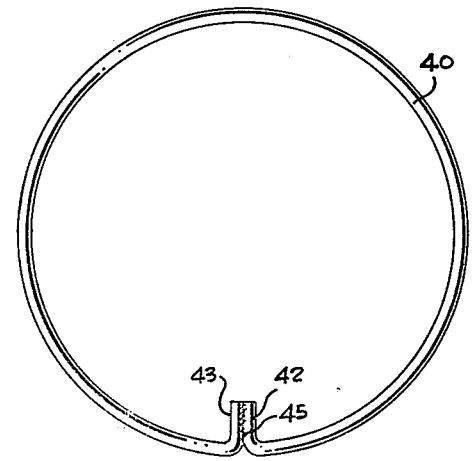
INVENTOR.
BURT S. MINOR
BY
ATTORNEYS Nov. 6, 1962    B. S. MINOR    3,061,862
PIPE WIPER AND METHOD OF MAKING THE SAME
Filed Feb. 21, 1961    2 Sheets-Sheet 2
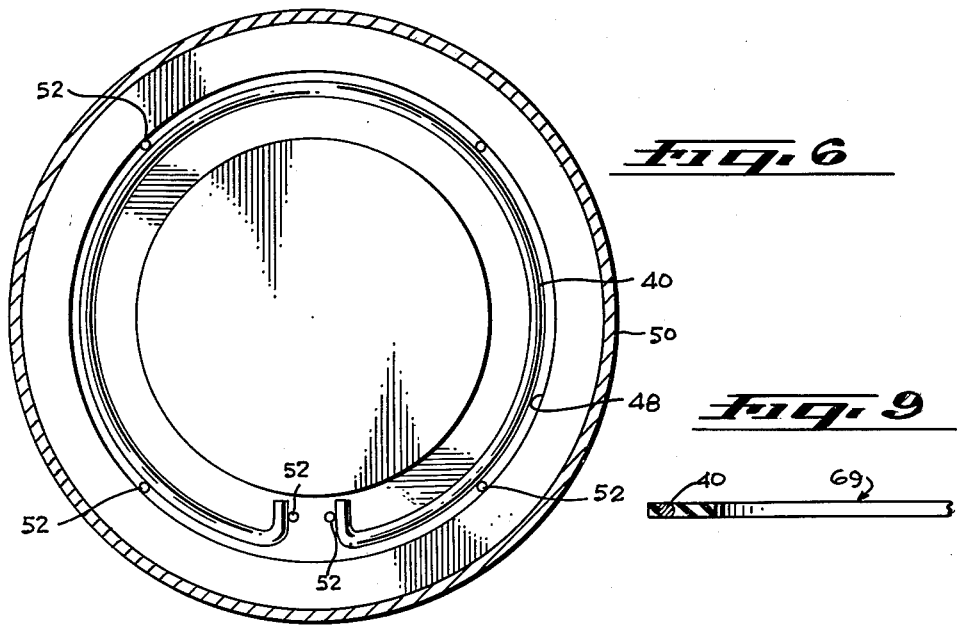
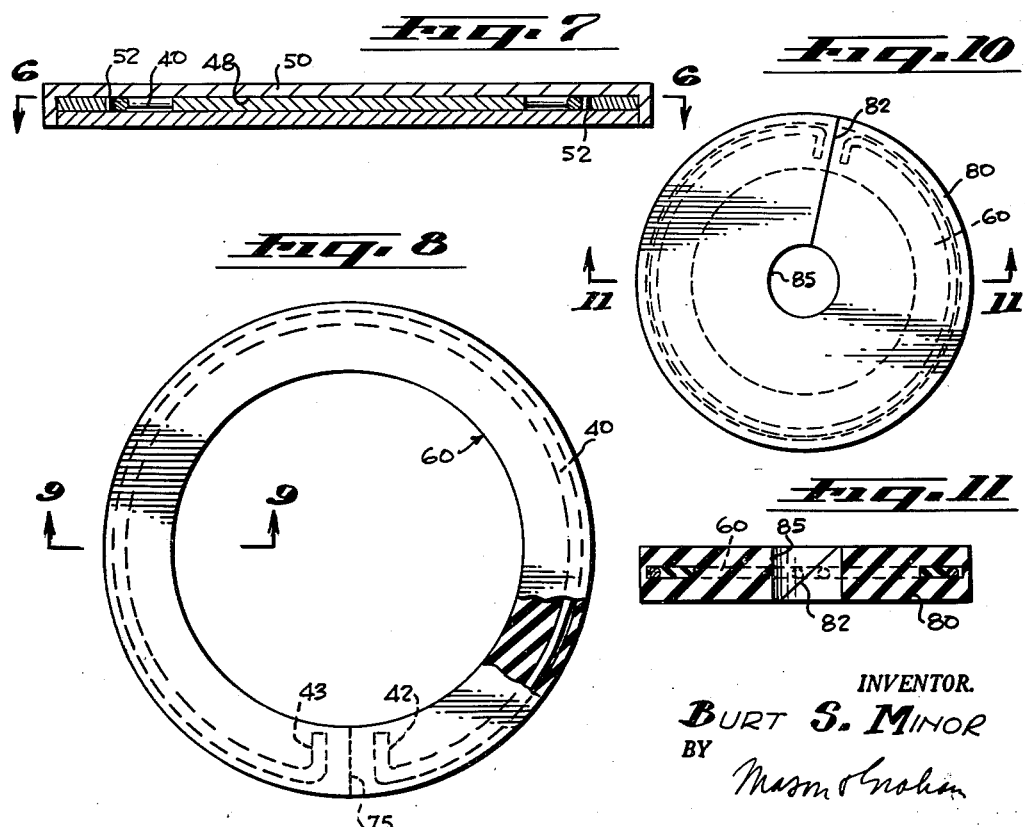
INVENTOR.
BURT S. MINOR
BY
ATTORNEYS

United States Patent Office 3,061,862
Patented Nov. 6, 1962

3,061,862
PIPE WIPER AND METHOD OF MAKING THE SAME
Burt S. Minor, La Habra, Calif., assignor to Bettis Rubber Company, Los Angeles, Calif., a corporation of California
Filed Feb. 21, 1961, Ser. No. 90,872
12 Claims. (Cl. 15—210)

My present invention has to do with resiliently reinforced, radially split annuli and, in its more particular aspects, relates to annuli peculiarly suited for use as pipe wipers capable of being laterally applied to a drill pipe, and to methods of making the same.

In drilling oil wells, for instance, the string of drill pipe is pulled through what is known in the well drilling art as a rotary table, and, in order to wipe accumulated mud and the like from the pipe as it is being withdrawn from the well, it is conventional practice to place a resilient rubber-like wiper or annulus on the pipe, the wiper having a pipe-passing hole in its center and being of large enough outside diameter to engage the bottom of the rotary table as the pipe is being withdrawn from the well.

Conventional pipe wipers are of such circular construction that they must be applied axially over the pipe, which is a time-consuming operation, and those working in the art have sought to provide a wiper which can be applied laterally to the pipe, which necessitates that the wiper be radially split or slit, the slit extending from the central pipe-passing opening radially through the periphery of the wiper.

A serious problem has been encountered in attempting to provide such a laterally applicable wiper in that after the wiper has been applied to the pipe and is in use, the segments of the wiper tend to separate along the slit, causing the wiper to become loose on the pipe and to lose its effectiveness as a wiper.

It is a principal object of my invention to provide such a radially slit wiper having novel and efficient reinforcing means for resiliently urging the segments of the wiper together along the split as well as to cause the wiper to firmly embrace the pipe.

It is a more specific object to provide a pipe wiper of the character described in which a prestressed radially split spring metal ring is embedded in the body of the wiper.

A further and even more particular object is to provide a wiper in which the reinforcing, prestressed spring metal ring is embedded, by molding, in a sufficiently hard rubber-like annulus to retain the metal ring in the prestressed condition, which annulus is incorporated in the wiper by molding.

A still further object of my invention is to provide a novel method of making a pipe wiper or annulus having the hereinabove-mentioned characteristics.

Additional objects and advantages will appear from the following detailed description of presently preferred embodiments of my invention, for which purpose I shall refer to the accompanying drawing in which:

FIG. 1 is a reduced side elevational view of one embodiment of my pipe wiper mounted on a drill pipe;

FIG. 2 is a top plan view of the wiper with a part being shown in section;

FIG. 3 is a side elevational view of the wiper;

FIG. 4 is a cross section taken on line 4—4 of FIG. 2;

FIG. 5 is a top plan view of a metallic reinforcing ring as used in my invention;

FIG. 6 is a top plan view showing a step in the formation of a part of my wiper in a mold, the view being taken on line 6—6 of FIG. 7;

FIG. 7 is a cross sectional view showing the step referred to in FIG. 6;

FIG. 8 is a top plan view of the reinforcing annulus or ring portion of my wiper before it is radially split;

FIG. 9 is a section taken on line 9—9 of FIG. 8;

FIG. 10 is a top plan view of a variational form of my wiper; and

FIG. 11 is a cross section taken on line 11—11 of FIG. 10.

Referring now to the drawing, I show (FIG. 1) a pipe wiper of the dual-disk type, generally denoted 5, which incorporates my invention and is shown mounted on a conventional drill pipe P.

The wiper consists of a body 6 comprising disks 10, 11 molded of resilient rubber-like or elastomeric material, preferably synthetic rubber material because such material is more resistant to oils and gases encountered in oil well drilling.

Each disk 10, 11 has an axial pipe-passing opening 15 which is slightly smaller in diameter than the outside diameter of the pipe P for efficient wiping action.

The disks 10, 11 are maintained spaced apart in superimposed relationship by means of integral, resilient rubber-like triangular spacers 20, 21, 22 and 23, which space the disks apart to provide a mud chamber 30 therebetween, the chamber having radial, circumferentially spaced outlets 32 between contiguous spacers.

Top disk 11 has a radial slit 35 extending from the axial opening 15 through its periphery, while disk 10 has a radial slit 37 extending from its axial opening through its periphery. The slits are preferably formed after the body 6 has been molded, as will be hereinafter pointed out, and said slits are spaced apart 180° circumferentially of the body so that they are circumferentially staggered in relation to each other.

Spacer 22 has a portion 22a at one side of slit 35, which portion is formed integral with disk 10, and has a portion 22b at the opposite side of said slit which merely forms a shoulder or abutment 22c for the portion of the disk 11 which overlies said abutment.

Spacer 23 has a portion 23a at one side of slit 37 which is formed integral with disk 11, and has a portion 23b at the opposite side of said slit which merely forms a shoulder or abutment 23c for the portion of disk 10 which underlies said abutment.

To install my wiper laterally on a drill pipe, one of the disks is manually deformed to open its split sufficiently to allow the pipe to be passed therealong from the periphery of the disk into the axial opening 15, and the other disk is then likewise deformed to open its slit for the same purpose, the wiper being rocked on the pipe during said installation procedure.

I shall now describe the means which I have provided for reinforcing and resisting circumferential separation of the segments of the respective disks along the respective slits as well as for resisting axial separation of the disks in the regions of the splits.

I first provide a radially split steel ring 40, preferably of round cross section, having its ends 42, 43 inturned and secured together as by tack welding, as shown at 45. The ring 40, with its said end portions thus secured together, is that heat-treated to spring temper in the conventional manner of heat-treating, after which the ends 42, 43 are severed along the tack weld, as by the use of a saw, and the split ring is placed in the annular cavity 48 of a mold 50, the mold fixedly carrying spacer pins 52 and ring positioning pins 54. Before placing the ring in said mold, the ring is prestressed by circumferentially spreading apart by force the end portions 42, 43, and during the molding operation, those ends are held thus separated by the spacer pins 52. The rubber molding material is then introduced into the cavity of the mold to cause the split ring 40 to become embedded in the thus molded semihard body of rubber-like material constituting an annulus or insert 60 (FIGS. 8 and 9). The semi-hard body of the annulus thus retains the split ring stressed.

After thus providing two annuli in such manner, they are positioned in spaced, superimposed relationship in a conventional mold 70 having a core 76 for forming the chamber 32 and spacers 20–23.

Rubber molding material is then introduced into the mold 70 to embed the annuli in the disk forming portions of the relatively soft elastic body of rubber-like material formed in the mold 70. The annuli are so positioned in the mold 70, before introducing said material, that the end portions 42, 43 of the respective split rings will be positioned in the body to be formed at opposite sides of the said slits 35, 37 to be subsequently formed therein.

After removing the thus molded body from the mold, a suitable tool is then used to cut the radial slits 35, 37 in the disks 10 and 11, to separate abutment 22c from the overlying portion of disk 11, and to separate the abutment 23c from the underlying portion of disk 10. As the slits 35 and 37 are being cut, the respective annuli or inserts are also radially slit along the line denoted in broken lines in FIG. 8 and given the reference numeral 75, which causes the slits in the annuli to coincide with the slits 35, 37.

After the wiper is thus completed and installed on a pipe in the manner described, the annuli containing the prestressed split rings 40 urge the segments of the disks together along the slits and also cause the disks to firmly embrace the pipe. The ends of each ring 40 are in the same plane so that they exert directly opposed forces on the disks at the slits and they also effectively resist axial separation of the segments of the disk in the region of the slits.

While I have described my invention as applying to a dual disk pipe wiper, it will be understood that it can be advantageously embodied in a single disk split wiper or annulus, as shown in FIGS. 10 and 11, in which an annulus 60, formed as before described, is embedded, by molding, in a disk 80 of relatively soft elastic rubber-like material, after which a diagonal radially extending slit 82 is formed in the disk and annulus, the slit extending from the axial opening 85 of the wiper radially outwardly through the periphery of the disk.

The purpose of making the slit 82 diagonal or Z shaped is to avoid the leaving of a mud streak on the pipe during the wiping operation.

I claim:

1. A pipe wiper comprising an annular body of elastomeric material having a radial split extending from its inner to its outer periphery, a radially split spring metal ring embedded in and extending circumferentially of said body, said body having abutment portions at the opposite sides of its said slit engaging and maintaining the end portions of said ring circumferentially spread apart whereby to maintain said ring stressed.

2. The pipe wiper of claim 1 wherein the material of said body is resilient.

3. The pipe wiper of claim 1 wherein the end portions of said ring are in a common plane.

4. The pipe wiper of claim 1 wherein each of the end portions of said ring is bent at an angle to the contiguous portion thereof.

5. The pipe wiper of claim 1 wherein said ring is of round cross section.

6. A pipe wiper comprising an annular disk-like body of deformable elastomeric material, a radially split annulus of relatively hard elastomeric material embedded in and extending circumferentially of said body, a radially split spring metal ring embedded in and extending circumferentially of said annulus, said annulus retaining the end portions of said ring resiliently spread apart in circumferential, opposed relationship whereby to stress said ring, and said body having a radial split extending from its inner to its outer periphery coinciding with the radial split in said annulus and extending between the end portions of said ring.

7. The pipe wiper of claim 6 wherein the material of said body is resilient.

8. The pipe wiper of claim 6 wherein said annulus is relatively hard and said body is relatively soft.

9. The pipe wiper of claim 6 wherein said ring has its end portions disposed at an angle to the contiguous portions thereof.

10. A pipe wiper capable of being laterally applied to a drill pipe, comprising a pair of superimposed radially split annular bodies of resilient, relatively soft, elastomeric material, the radial splits in said respective bodies being spaced 180° and each extending from the inner to the outer periphery of the body, spacer members disposed between and spaced apart circumferentially of said bodies, an annulus of relatively hard elastomeric material disposed circumferentially of and embedded in each of said bodies and having their respective splits coinciding with the respective splits in said bodies, and a radially split spring metal ring disposed circumferentially of and embedded in each of said annuli with its ends disposed in circumferentially opposed relationship and terminating short of the radial split therein; each of said rings being stressed to resiliently urge toward each other the ends of the annulus in which it is embedded.

11. The method of making and resilently reinforcing and prestressing a deformable annular body by a radially split steel ring which comprises the steps of securing the ends of said ring together while heat-treating it to spring temper, separating and circumferentially spreading apart said ends of said spring-tempered ring, retaining said ends of said ring so spread apart while molding an annular body of resilent elastomeric material about said ring to permanently stress said body, and then providing a radial split in said body which extends between the ends of said ring.

12. The method of making and resilently reinforcing and prestressing a deformable annular radially split body by a radially split steel ring which comprises the steps of heat-treating said ring to spring temper while its ends are in abutting relationship circumferentially spreading apart said ends of said spring-tempered ring, retaining said ends of said ring so spread apart while molding a first annular body of relatively hard elastomeric material about said ring to permanently stress said first body, molding a second annular body of relativley soft resilient elastomeric material about said first annular body, and then providing a split radially through said bodies between the ends of said ring.

References Cited in the file of this patent

UNITED STATES PATENTS

| | | |
|---|---|---|
| 202,988 | Cate | Apr. 30, 1878 |
| 2,328,127 | Crickmer | Aug. 31, 1943 |
| 2,540,932 | Clark | Feb. 6, 1951 |
| 2,668,329 | Landau | Feb. 9, 1954 |
| 2,821,730 | Shellman | Feb. 4, 1958 |
| 2,866,217 | Dean | Dec. 30, 1958 |
| 2,880,440 | Shipley | Apr. 7, 1959 |
| 2,928,114 | Ballard | Mar. 15, 1960 |
| 2,966,690 | Taylor | Jan. 30, 1961 |